(12) United States Patent
Brand (10) Patent No.: US 10,375,166 B2
(45) Date of Patent: Aug. 6, 2019

(54) CACHING DEVICE AND METHOD THEREOF FOR INTEGRATION WITH A CLOUD STORAGE SYSTEM

(71) Applicant: CTERA Networks, Ltd., Petach Tikva (IL)

(72) Inventor: Aron Brand, Petach-Tikva (IL)

(73) Assignee: CTERA Networks, Ltd., Petach-Tikva (IL)

( * ) Notice: Subject to any disclaimer, the term of this patent is extended or adjusted under 35 U.S.C. 154(b) by 0 days.

(21) Appl. No.: 14/572,067

(22) Filed: Dec. 16, 2014

(65) Prior Publication Data

US 2015/0106470 A1 Apr. 16, 2015
US 2019/0098108 A9 Mar. 28, 2019

Related U.S. Application Data

(63) Continuation of application No. 13/188,144, filed on Jul. 21, 2011, now Pat. No. 8,924,511, and a continuation of application No. 12/641,559, filed on Dec. 18, 2009, now Pat. No. 9,614,924.

(60) Provisional application No. 61/140,071, filed on Dec. 22, 2008.

(51) Int. Cl.

| H04L 29/06 | (2006.01) |
|---|---|
| H04L 29/08 | (2006.01) |
| G06F 16/178 | (2019.01) |
| H04L 9/06 | (2006.01) |
| H04L 9/32 | (2006.01) |

(52) U.S. Cl.
CPC ........ *H04L 67/1097* (2013.01); *G06F 16/178* (2019.01); *H04L 67/1095* (2013.01); *H04L 67/2842* (2013.01); *H04L 9/0618* (2013.01); *H04L 9/3242* (2013.01); *H04L 69/04* (2013.01)

(58) Field of Classification Search
CPC ............. H04L 67/2842; H04L 67/1097; H04L 9/0822; G06F 17/30174
USPC ....................................................... 709/218
See application file for complete search history.

(56) References Cited

U.S. PATENT DOCUMENTS

| 6,470,329 | B1 | 10/2002 | Livschitz | |
|---|---|---|---|---|
| 7,113,963 | B1 * | 9/2006 | McCaw | ............ G06F 17/30575 |
| 7,203,796 | B1 * | 4/2007 | Muppalaneni | ...... G06F 11/2076 |
| | | | | 711/114 |
| 7,325,145 | B1 | 1/2008 | England | |
| 7,430,639 | B1 | 9/2008 | Bali et al. | |
| 7,596,620 | B1 | 9/2009 | Colton et al. | |
| 7,752,180 | B1 * | 7/2010 | Fair | ..................... G06F 11/1435 |
| | | | | 707/649 |
| 7,865,663 | B1 | 1/2011 | Nelson et al. | |
| 8,127,358 | B1 | 2/2012 | Lee | |
| 8,135,683 | B2 | 3/2012 | Douglis et al. | |
| 8,595,847 | B2 | 11/2013 | Petta et al. | |

(Continued)

*Primary Examiner* — Aaron N Strange
(74) *Attorney, Agent, or Firm* — M&B IP Analysts, LLC (57) ABSTRACT

A network attached storage device and method for performing network attached storage operations with cloud storage services are provided. The device includes at least one network controller for communicating with a plurality of clients over a local area network (LAN) and with the cloud storage service (CSS) over a wide area network (WAN); a cache memory for locally caching data of the CSS in the device; and a virtual cloud drive (VCD) for enabling the plurality of clients to perform file-based operations on data stored in the CSS using at least one file sharing protocol.

9 Claims, 6 Drawing Sheets

(56) References Cited

U.S. PATENT DOCUMENTS

| | | |
|---|---|---|
| 2002/0095598 A1 | 7/2002 | Camble et al. |
| 2003/0074574 A1 | 4/2003 | Hursey et al. |
| 2004/0039889 A1 | 2/2004 | Elder et al. |
| 2004/0054891 A1* | 3/2004 | Hengeveld ............ H04L 9/0822 713/163 |
| 2004/0098539 A1 | 5/2004 | Frank |
| 2004/0143713 A1 | 7/2004 | Niles et al. |
| 2005/0071586 A1 | 3/2005 | Bartfai et al. |
| 2005/0097225 A1* | 5/2005 | Glatt ................... H04L 67/1095 709/248 |
| 2006/0010154 A1* | 1/2006 | Prahlad ............. G06F 17/30197 |
| 2006/0230076 A1 | 10/2006 | Gounares et al. |
| 2006/0230245 A1 | 10/2006 | Gounares et al. |
| 2006/0239275 A1 | 10/2006 | Zlateff et al. |
| 2007/0143589 A1 | 6/2007 | Rawe et al. |
| 2007/0162510 A1 | 7/2007 | Lenzmeier et al. |
| 2007/0250593 A1 | 10/2007 | Sikdar et al. |
| 2008/0005168 A1 | 1/2008 | Huff et al. |
| 2008/0040420 A1 | 2/2008 | Twiss et al. |
| 2008/0080552 A1 | 4/2008 | Gates et al. |
| 2008/0288301 A1* | 11/2008 | Emling ................. G06Q 40/08 705/4 |
| 2008/0289006 A1 | 11/2008 | Hock et al. |
| 2008/0317068 A1 | 12/2008 | Sagar et al. |
| 2009/0006792 A1 | 1/2009 | Federwisch et al. |
| 2009/0006869 A1 | 1/2009 | Satya |
| 2009/0007234 A1 | 1/2009 | Birger et al. |
| 2009/0031212 A1 | 1/2009 | Hsu |
| 2009/0144422 A1 | 6/2009 | Chatley et al. |
| 2009/0248693 A1 | 10/2009 | Sagar et al. |
| 2009/0288169 A1 | 11/2009 | Petta et al. |
| 2009/0300169 A1 | 12/2009 | Sagar et al. |
| 2010/0042720 A1 | 2/2010 | Stienhans et al. |
| 2010/0088150 A1 | 4/2010 | Mazhar et al. |
| 2010/0149096 A1* | 6/2010 | Migos ................. G06F 3/04883 345/158 |
| 2010/0274982 A1* | 10/2010 | Mehr .................. G06F 11/1458 711/162 |
| 2010/0318632 A1* | 12/2010 | Yoo ....................... H04L 65/605 709/219 |
| 2010/0332401 A1 | 12/2010 | Prahlad et al. |
| 2010/0332588 A1 | 12/2010 | Schwimer |
| 2013/0204849 A1 | 8/2013 | Chacko |
| 2014/0082131 A1 | 3/2014 | Jagtap |
| 2014/0082156 A1 | 3/2014 | Jagtap |

* cited by examiner

CACHING DEVICE AND METHOD THEREOF FOR INTEGRATION WITH A CLOUD STORAGE SYSTEM

CROSS REFERENCE TO RELATED APPLICATIONS

This application is a continuation of U.S. patent application Ser. No. 13/188,144 filed on Jul. 21, 2011, now allowed, which is a continuation of U.S. patent application Ser. No. 12/641,559, filed on Dec. 18, 2009, now pending. All of the above-referenced applications are herein incorporated by reference for all that they contain.

TECHNICAL FIELD

The present invention relates generally to storage networks, and more particularly to integrated local and cloud storage services.

BACKGROUND

The demand for storage has been rapidly increasing. As the amount of data such as digital media stored by users grows, so does the need to store digital media reliably over extended periods of time. Traditional, backup solutions periodically copy data to, for example, backup tapes, compact discs (CDs), or other local storage media. However, such solutions are not optimal, as the backup media is stored in a single location and media used for backups are prone to failure.

Other solutions include storing data files on a local hard-drive of a personal computer (PC) and synchronizing the data remotely using hosted storage services. Having a remote backup ensures that data is stored in multiple locations and is protected from local disasters, such as fires or floods. However, such solutions require installation of special client software on each individual PC, which is prone to software incompatibilities, lack of central control, and high deployment cost.

Figure 1:
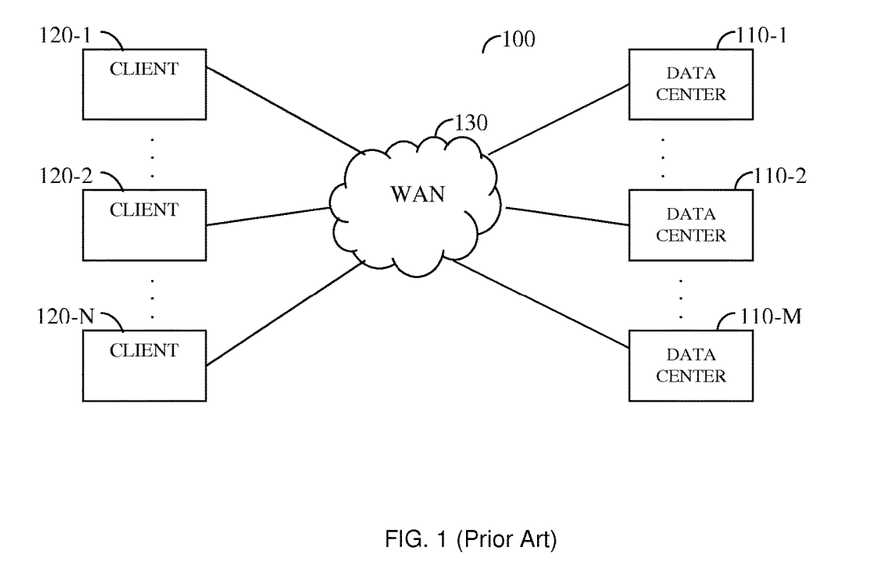
FIG. 1 is a diagram of a storage network system.

Commercially available services referred to as cloud storage services provide mass storage through a web service interface available through the Internet. FIG. 1 illustrates a storage system 100 designed to provide cloud storage services. The system 100 includes a distributed array of geographically distributed data centers 110-1 to 110-M connected to a plurality of clients 120-1 to 120-N through a wide area network (WAN) 130.

A data center 110 typically consists of servers and mass storage facilitating cloud storage services to the clients 120. Such services enable applications including, for example, backup and restoration of data, data migration, data sharing, data collaboration, and so on. Cloud storage services are accessible from anywhere in the world. To this end, each client 120 implements a web services interface designed to at least synchronize data with the data centers 110. Applications enabled by the cloud storage services are not aware of the specifics of the services and the underlying data synchronization operations. The disadvantage of commercially available cloud storage services is that such services do not implement standard file sharing protocols (e.g., common internet file system (CIFS) or network file system (NFS)). Furthermore, accessing files stored in the cloud storage is typically slower than accessing files stored in local storage devices.

A network-attached storage (NAS) device is a self-contained appliance connected to a network with a primary purpose of supplying file-based data storage services to clients on the network. Specifically, a NAS device provides the functionality of data storage, file-based operations (e.g., read, write, delete, modify, etc.), and the management of these functionalities. However, commercially available NAS devices do not operate in conjunction with cloud storage services. Therefore, organizations and businesses utilizing NAS devices to store and manage their data cannot benefit from mass storage and applications of cloud storage services.

It would be therefore advantageous to provide a solution for integrating NAS devices with cloud storage services.

SUMMARY

Certain embodiments disclosed herein include a network attached storage device for performing network attached storage operations with cloud storage services. The device includes at least one network controller for communicating with a plurality of clients over a local area network (LAN) and with the cloud storage service (CSS) over a wide area network (WAN); a cache memory for locally caching data of the CSS in the device; and a virtual cloud drive (VCD) for enabling the plurality of clients to perform file-based operations on data stored in the CSS using at least one file sharing protocol.

Certain embodiments disclosed herein also include a method for performing network attached storage operations with cloud storage services. The method comprises receive a request from a client of a plurality of clients to read a byte range of a file in a virtual cloud drive (VCD); determine a set of data blocks required for reconstructing the byte range; determine if a first set of data blocks of the set of data blocks is maintained in a cache memory; fetch the first set of data blocks from the cache memory, upon determining that the first set of data blocks is maintained in the cache memory; retrieve a second set of data blocks from at least one cloud storage service (CSS), wherein the second set of data blocks are data blocks within the byte range that are not maintained in the cache memory; reconstruct the byte range from the first set and second set of data blocks; and return the reconstructed data to the client.

Certain embodiments disclosed herein also include a network attached storage device for performing network attached storage operations with cloud storage services. The method comprises at least one network controller for communicating with a plurality of clients over a local area network (LAN) and with a cloud storage service (CSS) over a wide area network (WAN); a plurality of storage devices for locally storing data in the device; a CSS module for bidirectional synchronizing between data locally stored in the plurality of storage devices and data stored in the CSS and for unidirectional synchronizing of data locally stored in the plurality of storage devices; and a processor for enabling the plurality of clients to perform file-based operations on the device using a file sharing protocol.

BRIEF DESCRIPTION OF THE DRAWINGS

The subject matter herein disclosed is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
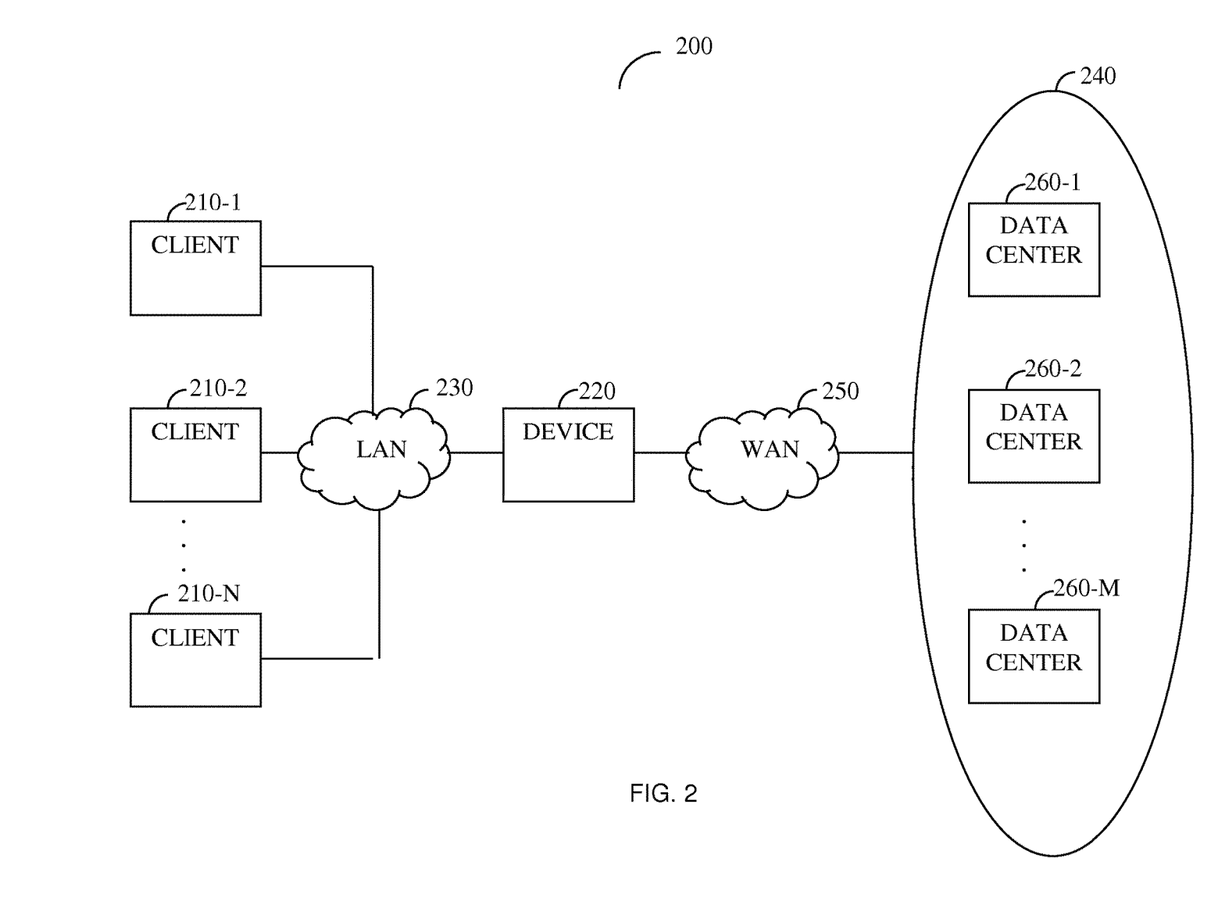
FIG. 2 is a storage network system used to describe the various disclosed embodiments.

FIG. 2 shows an exemplary and non-limiting diagram of a storage network system 200 utilized to describe the various disclosed embodiments. The system 200 includes clients 210-1 to 210-N (hereinafter referred to individually as a client 210 or collectively as clients 210) connected to a device 220 through a local area network (LAN) 230, which may be either a wireless or wired network. The clients 210 can perform file-based operations on the device 220 by using any type of a file sharing protocol including, but not limited to, a network file system (NFS), a common internet file system (CIFS), and the like. In addition, the device 220 is connected to data centers 260-1 to 260-M through a network 250. The network 250 may be the Internet or a wide area network (WAN). The data centers 260 may be geographically distributed and implemented via a cloud storage service (CSS) 240 constructed in accordance with an embodiment.

Figure 3:
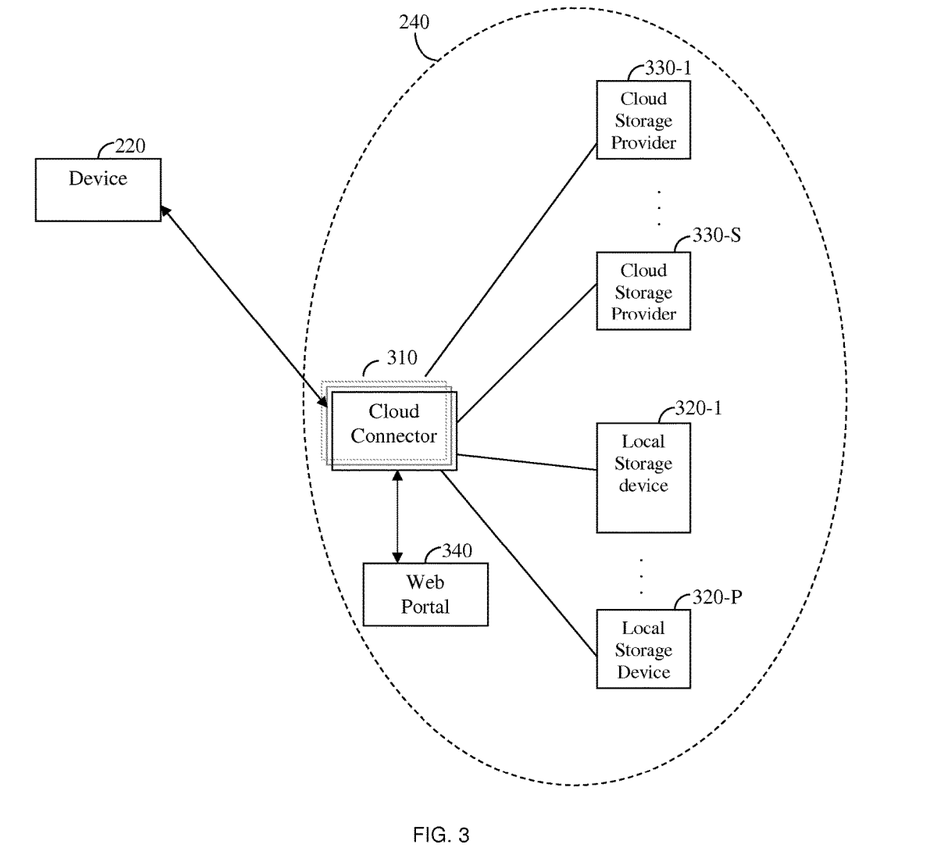
FIG. 3 is a cloud storage service (CSS) constructed in accordance with an embodiment.

As illustrated in FIG. 3, the CSS 240 consists of a plurality of cloud connectors 310 that facilitate connections between the device 220 and storage devices 320-1 to 320-P (e.g., disk drives and/or SAN/NAS devices) as well as connections to third party cloud storage providers 330-1 to 330-S (e.g., Amazon Web Services, Nirvanix, etc.). The cloud connectors 310 operate in parallel to enable load balancing and to avoid a single point of failure. In one embodiment, the web portal 340 is also provided to enable users to perform at least file-based operations on files stored in the CSS 240 using a web-based interface. In accordance with one embodiment, local storage devices 320-1 to 320-P are administratively organized in device groups (DGs), each DG contains one or more devices, and when block encryption is used, DGs share the same block encryption key.

Figure 4:
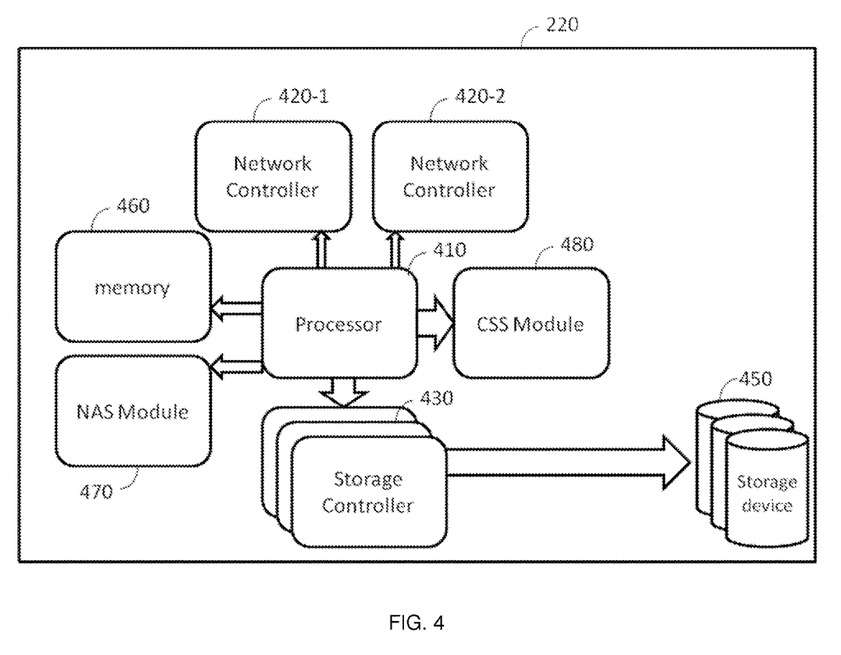
FIG. 4 is an exemplary and non-limiting block diagram of a device constructed in accordance with an embodiment.

According to certain embodiments, in order to allow transparent access from clients 210 to files stored in the CSS 240, the device 220 provides a shared network folder (hereinafter the "virtual cloud drive" (VCD)). The VCD exposes files that are stored at the CSS 240. When a client 210 tries to access a specific byte range from a VCD of the device 220 that is mapped to the CSS 240, the device 220 transparently contacts the CSS 240 and requests the blocks including the requested byte range on behalf of the client 210. The blocks are then reassembled, decrypted and decompressed as needed, to recover the original byte range. The reconstructed byte range is then returned to the client 210. To the client 210, the file appears to be stored locally on the device 220. The device 220 may cache recently and/or frequently accessed data blocks in the memory 460 and/or in the storage 450. Such blocks can be returned directly from the cache instead of from the CSS 240.

FIG. 4 shows an exemplary and non-limiting block diagram of the device 220 according to an embodiment. The device 220 includes a processor 410, network controllers 420-1 and 420-2 for interfacing with at least the LAN 230 and the network 250, a plurality of storage controllers 430 for controlling storage devices 450 attached to the device 220, and a non-volatile memory 460 for at least storing settings and configuration parameters required for the proper operation of the device 220. The memory 460 may be utilized to cache data transferred between the storage devices 450 and CSS 240. The memory 460 may also include software code executable by the processor 410. In certain embodiments, communication with the networks 230 and 250 may be achieved using a single network controller.

The device 220 further includes a NAS module 470 emulating the device 220 as a NAS device and a CSS module 480 allowing the integration of the device 220 with the CSS 240. In accordance with an embodiment, the processor 410 runs an operating system (not shown) adapted to provide file-based operations on the CSS and further to control the operation of the modules 470 and 480. The storage controllers 430 include, but are not limited to, a small computer system interface (SCSI), a serial advanced technology attachment (SATA), a universal serial bus (USB), a fibre channel (FC), a serial attached SCSI (SAS), and the like. In certain embodiments, the storage devices 450 may be external to the device 220.

One of the primary tasks of the CSS module 480 is to periodically synchronize data between the device 220 (i.e., data stored in the storage devices 450) and the CSS 240. The synchronization may be in the direction from the device 220 to the CSS 240 (hereinafter "the outgoing direction"), in the direction from the CSS 240 to the device 220 (hereinafter "the incoming direction"), or simultaneously in both directions. It should be noted that all files can be synchronized, or a partial subset of the files can be synchronized.

Synchronization in the outgoing direction is typically used as a data backup mechanism, allowing files to be backed up to the CSS 240 for safekeeping. Synchronization in the incoming direction is typically used as a data distribution mechanism, allowing files to be distributed from the CSS 240 at the device 220 to provide fast and reliable local access to a set of files. Synchronization in both directions (bidirectional) is used to maintain data consistency between the device 220 and CSS 240. This allows files to be modified or created both in the device 220 (through a filing sharing protocol) and in the CSS 240 (through the web portal 340). It should be noted that, in certain embodiments, when using bidirectional synchronization, one or more devices 220 can be optionally synchronized to a single location in the CSS 240. This enables multiple devices 220 to synchronize with each other through the CSS 240, which acts as a mediator.

Figure 5:
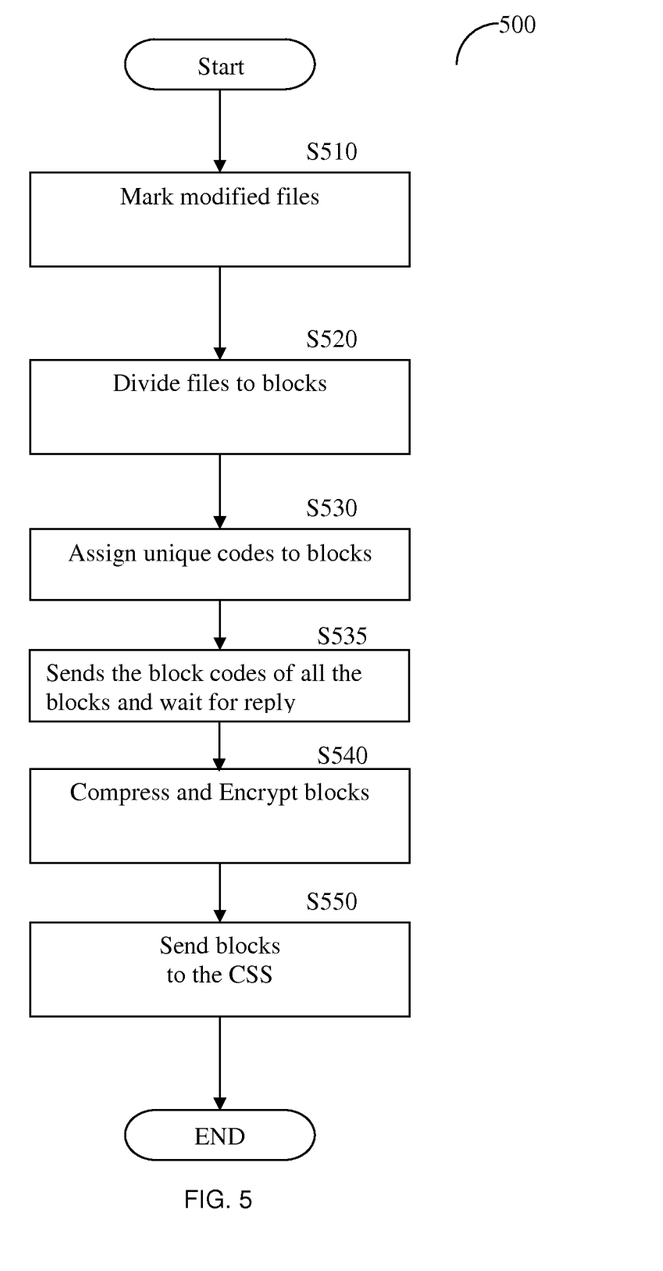
FIG. 5 is an exemplary flowchart describing the process for data synchronization implemented in accordance with an embodiment.

FIG. 5 is an exemplary flowchart 500 describing data synchronization implemented according to an embodiment. The data synchronization will be described with reference to a specific embodiment where the synchronization is performed in the outgoing direction. However, one of ordinary skill in the art can easily adapt the process 500 for synchronization of data in the ingoing or bidirectional directions.

In S510, files stored either in the device 220 or CSS 240 that have been changed since the last synchronization are marked. At S520, each marked file is divided into variable size blocks. At S530, each block is assigned with a unique code using, for example, a message digest code (MDC) function. Thus, each block is addressed by its unique code. In accordance with an embodiment, steps S510, S520, and S530 can be executed concurrently in a pipelined fashion rather than sequentially, to provide higher efficiency.

Thereafter, it is determined which of the data blocks have been modified. With this aim, at S535, the device 220 sends the block codes of all the blocks in a file to the CSS 240, which checks whether a block with the same code exists on the scope of the same DG. If a block with the same code already exists on the CSS 240 in the same DG, then the block does not need to be transmitted. In an embodiment, the device 220 sends the block codes of all the blocks in each file to the CSS 240. The CSS 240 then replies with a compact run length encoded (RLE) list of the blocks which are missing on the CSS and which should be transferred.

The CSS 240 maintains a reference count for each block, which is increased by 1 for each file that uses the block. When a file is deleted from the CSS 240, the reference count of all the blocks of the file is reduced by 1. When the reference count of a block reaches 0, this block is no longer used by any file and the storage space of this block may be freed. It should be appreciated that this approach results in significant storage space reduction, as multiple identical files or parts of files belonging to devices in each DG are stored only once in the CSS 240. This approach also reduces the consumption of network bandwidth, as only modified blocks are transmitted over the network 250. Furthermore, the CSS 240 can store a number of previous versions for each file, allowing the user to restore a file to an earlier version. Since the file is stored as multiple blocks, the entire file does not need to be duplicated. Rather, only the differences between file versions are stored. This reduces the required storage space for file versioning.

At S540, all modified blocks that should be sent over the network 250 may be encrypted and compressed using lossless compression algorithm, to reduce the bandwidth requirements. The encryption may be a block level encryption that uses, for example, a keyed hash cryptographic message digest code (HMAC) function to add an authentication code to each block. In many cases, the operator of the CSS is not considered a trusted party by the device owner. Thus, the encryption key can be known only to the owner of the device 220, thereby preventing even the operator of the CSS 240 from viewing or altering the contents of the stored files.

At S550 all modified blocks (which may be optionally encrypted and compressed) are transmitted from the device 220 to the CSS 240 over the network 250. It should be noted that multiple blocks are transmitted without waiting for the CSS 240 to acknowledge the reception of a previously transmitted block, thereby enabling efficient utilization of high latency links.

The communication between the device 220 and CSS 240 is performed by means of a cloud transport protocol (CTP) implemented in accordance with an embodiment. The CTP is a secure, encrypted connection based on Transmission Control Protocol (TCP)/internet protocol (IP), such as secure sockets layer (SSL) or transport level security (TLS). This ensures confidentiality against external eavesdroppers and malicious modification of the data in transit. The CTP also supports a message framing protocol for sending and receiving arbitrary length messages between the device 220 and the CSS 240, and implements an authentication method by which the device 220 authenticates the CSS 240, for example, by using a security certificate (asymmetric key), or by means of a symmetric secret key or password. The CSS 240 authenticates to the device 220 by, for example, using a security certificate (asymmetric key), thus preventing an attacker from impersonating the CSS 240.

In addition to synchronizing files with the local storage available on the device 220, the CSS 240 can be utilized to expand the amount of local storage on the device 220. With this aim, the CSS 240 is exposed on the device 220 as an extended storage space in the device 220. This allows the device 220 to have the capacity of a mass storage system (i.e., practically infinite storage space) and, specifically, to allow small NAS-like devices to have the storage space of mass storage systems. To allow access to the extended storage space as if it is on the device itself, the VCD allows read/write operations on the expanded storage space on the CSS 240.

Figure 6:
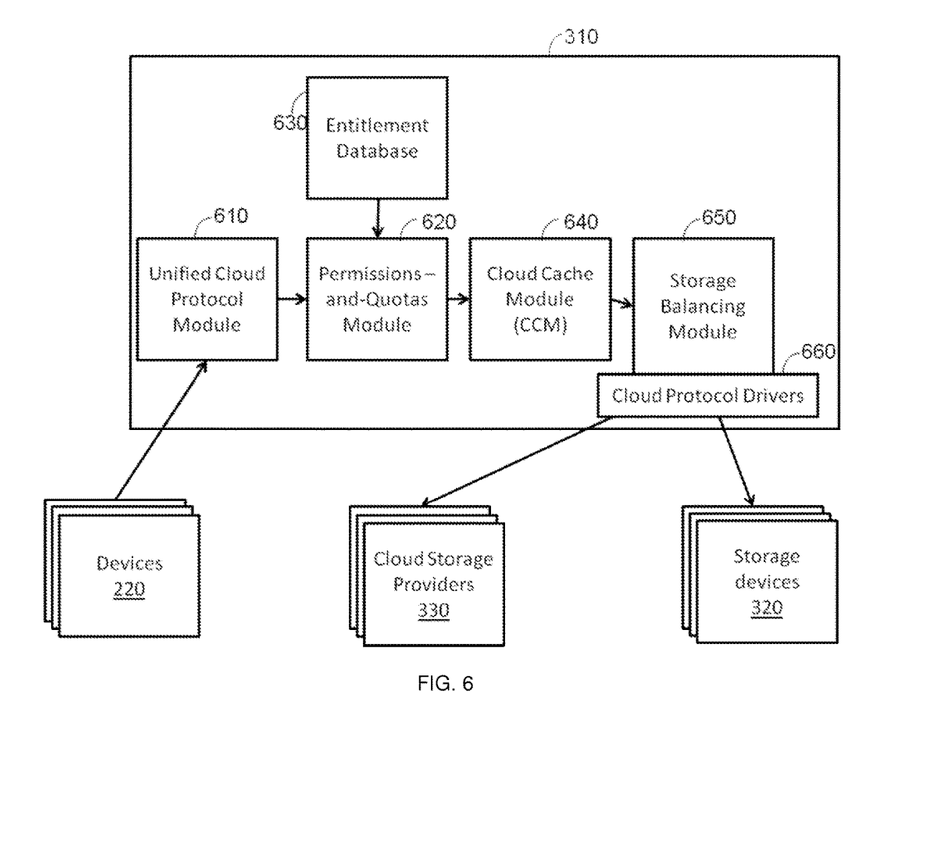
FIG. 6 is an exemplary and non-limiting block diagram of a cloud connector implemented in accordance with an embodiment.

FIG. 6 shows an exemplary and non-limiting block diagram of a cloud connector (CC) 310 implemented in accordance with an embodiment. As mentioned above, one of the tasks of a cloud connector 310 is to interface between the device 220 and the storage devices 320 as well as to provide connections to cloud storage providers 330. In the current market place, there are a multitude of cloud storage service providers. However, due to a lack of a universal standard for a protocol of a cloud storage provider, most providers use proprietary interfaces and protocols. To resolve this drawback, the cloud connector 310 provides the device 220 with a unified communication protocol to access one or more cloud storage providers 330. Specifically, the cloud connector 310 acts as a gateway and translates the unified protocol used to communicate with the device 220 to the protocols implemented by different cloud storage providers 330. It should be appreciated that this approach reduces the complexity of the device implementation, as the device 220 is not required to communicate directly with the various cloud storage providers. This approach further allows adding new cloud storage providers without modifying the device 220 or the clients 210. In addition to providing a unified interface to cloud storage providers 330, the cloud connector 310 can provide the same interface for the storage devices 320.

The cloud connector 310 includes a unified cloud protocol module 610 for communicating with the device 220 by means of the cloud transport protocol described above. The cloud connector 310 also includes a permissions-and-quotas enforcement module 620, a service entitlement database 630, a cloud cache module (CCM) 640, a storage balancing module 650, and one or more cloud protocol drivers 660 for interfacing with storage devices and cloud storage providers in the CSS 240.

The storage balancing module 650 performs load balancing between multiple cloud storage providers and possibly multiple local storage devices 330 based on criteria including, but not restricted to, performance, cost and reliability. For example, a simplistic balancing scheme could be to store 20 percent of the data to a storage device 320, and 80 percent to a cloud storage provider 330. The split between the cloud storage providers 330 can be either static (for example, according to the block code) or dynamic (for example, based on the current cost and availability of each cloud storage provider).

The CCM 640 may cache recently used or frequently accessed data blocks locally, for reduction in communication costs to the cloud storage providers and reduced latency.

The permissions-and-quota module 620 enforces and restricts access of the devices 220 to data blocks according to a list of access control rules. The permissions- and quota module 620 can also enforce storage quotas for each device 220 and provide differentiated service levels per customer. The entitlement database 630 is used to store the service level agreement (SLA) for each of the customers, having accesses through clients 210, subscribed to the third party cloud storage services 330. When a customer connects to the CSS 240, the entitlement database 630 is accessed to check whether the customer is entitled to the requested service. In addition, the entitlement database 630 contains additional service level information, such as storage and bandwidth quotas for each customer. It should be appreciated that the embodiments described herein provides a storage solution that combines the speed and practicality of NAS devices on the local network, with the scalability and disaster protection of cloud storage services.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A network attached storage device for performing network attached storage operations with cloud storage services, comprising:
   at least one network controller for communicating with a plurality of clients over a local area network (LAN) and with the cloud storage service (CSS) over a wide area network (WAN);
   a cache memory for locally caching data of the CSS in the device; and
   a virtual cloud drive (VCD) for enabling the plurality of clients to perform file-based operations on data stored in the CSS using at least one file sharing protocol, wherein the device is further configured to:
      receive a request, from a client of the plurality of clients, to read a byte range of a file in the VCD;
      determine a set of data blocks required for reconstructing the byte range;
      determine if a first set of data blocks of the set of data blocks is maintained in the cache memory;
      fetch the first set of data blocks from the cache memory, upon determining that the first set of data blocks is maintained in the cache memory;
      retrieve a second set of data blocks from the CSS, wherein the second set of data blocks are data blocks within the byte range that are not maintained in the cache memory; and
      return a reconstructed byte range to the client based on the first and second data blocks.

2. The device of claim 1, wherein the VCD is configured to expose files stored in the CSS.

3. The device of claim 1, wherein the file sharing protocol is at least any one of: a network file system (NFS) and a common internet file system (CIFS).

4. The device of claim 1, wherein the cache memory is any one of: a volatile memory and a non-volatile memory.

5. The device of claim 1, wherein the first set of blocks includes at least any one of: recently accessed data blocks and frequently accessed data blocks.

6. A method for performing network attached storage operations with cloud storage services, comprising:
   receiving a request from a client of a plurality of clients to read a byte range of a file in a virtual cloud drive (VCD);
   determining a set of data blocks required for reconstructing the byte range;
   determining if a first set of data blocks of the set of data blocks is maintained in a cache memory;
   fetching the first set of data blocks from the cache memory, upon determining that the first set of data blocks is maintained in the cache memory;
   retrieving a second set of data blocks from at least one cloud storage service (CSS), wherein the second set of data blocks are data blocks within the byte range that are not maintained in the cache memory;
   reconstructing the byte range from the first set and second set of data blocks;
   returning the reconstructed data to the client;
   enabling, by the VCD, the plurality of clients to perform file-based operations on data stored in the at least one CSS using at least one file sharing protocol; and
   exposing, by the VCD, files stored in the CSS.

7. The method of claim 6, wherein the file sharing protocol is at least any one of: a network file system (NFS) and a common internet file system (CIFS).

8. The method of claim 6, wherein the first set of blocks includes at least any one of: recently accessed data blocks and frequently accessed data blocks.

9. A non-transitory computer readable medium having stored thereon instructions for causing one or more processing units to execute the method according to claim 6.

* * * * *